(12) United States Patent
Morris et al.

(10) Patent No.: US 8,176,499 B2
(45) Date of Patent: May 8, 2012

(54) DEFINING, DISTRIBUTING AND PRESENTING DEVICE EXPERIENCES

(75) Inventors: Max G. Morris, Seattle, WA (US); Marc Pottier, Seattle, WA (US); Gabriel S. DeBacker, Carnation, WA (US); Mitchell K. Rundle, Bellevue, WA (US); Dennis Edward Flanagan, Bellevue, WA (US); Robin L. Goldstein, Bellevue, WA (US); Steven J. Ball, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 12/130,328

(22) Filed: May 30, 2008

(65) Prior Publication Data
US 2009/0300658 A1    Dec. 3, 2009

(51) Int. Cl.
*G06F 3/00*    (2006.01)
*G06F 17/00*    (2006.01)
(52) U.S. Cl. .......................................... 719/310; 5/200
(58) Field of Classification Search ............ 719/310; 715/200
See application file for complete search history.

(56) References Cited

U.S. PATENT DOCUMENTS

| | | | |
|---|---|---|---|
| 6,148,346 A | 11/2000 | Hanson | |
| 6,192,415 B1 * | 2/2001 | Haverstock et al. | 709/245 |
| 6,505,243 B1 | 1/2003 | Lortz | |
| 6,768,994 B1 * | 7/2004 | Howard et al. | 1/1 |
| 6,857,013 B2 | 2/2005 | Ramberg et al. | |
| 6,957,347 B2 | 10/2005 | Braam et al. | |
| 7,130,895 B2 | 10/2006 | Zintel et al. | |
| 7,245,906 B2 | 7/2007 | Hirata | |
| 7,478,048 B2 * | 1/2009 | Yeh et al. | 704/270.1 |
| 2002/0062287 A1 | 5/2002 | Katz et al. | |
| 2003/0061333 A1 | 3/2003 | Dean et al. | |
| 2003/0131147 A1 | 7/2003 | Wilt et al. | |
| 2004/0261084 A1 | 12/2004 | Rosenbloom et al. | |
| 2005/0257218 A1 | 11/2005 | Lin | |
| 2005/0257226 A1 | 11/2005 | Belvin et al. | |
| 2006/0130151 A1 | 6/2006 | Wu et al. | |
| 2007/0150816 A1 | 6/2007 | Hariki | |
| 2007/0180445 A1 | 8/2007 | Greeff | |

OTHER PUBLICATIONS

Ales Horak, DEBVisDic—First Verson of New Client-Server Wordnet Browsing and Editing tool, 2005.*
"Windows Platform Design Notes", 2002, pp. 1-8.
"Common-Driver-Library Architecture Supports, Maintains Products", http://www.edn.com/index.asp?layout=article&articleid=CA6288039.
"Windows Server 2003 in a Managed Environment", http://www.microsoft.com/technet/prodtechnol/windowsserver2003/technologies/security/ws03mngd/16_s3onl.mspx.

* cited by examiner

Primary Examiner — Lechi Truong
(74) Attorney, Agent, or Firm — Mayer & Williams P.C.

(57) ABSTRACT

Platforms and techniques for defining, authorizing/authenticating, distributing, and presenting dynamic device experiences using a number of hierarchically-related, declarative language data structures, such as extensible markup language ("XML") elements or attributes. A dynamic device experience is presented when two electronic devices are in communication via a communication medium. The data structures are processed to present a graphical user interface to a user—the graphical user interface implements a dynamic device experience associated with the other electronic device. In one exemplary scenario, independent hardware vendors ("IHVs") author XML documents that include device experience information (such as branding or advertising information, access to Web services or applications, and access to device functionality), in the form of items of data stored in the data structures. The XML documents are verified against a predetermined schema, secured using a cryptographic technique such as a digital signature, and discovered/distributed in flexible, tamper-resistant manners.

19 Claims, 6 Drawing Sheets

DEFINING, DISTRIBUTING AND PRESENTING DEVICE EXPERIENCES

BACKGROUND

Many types of electronic devices are equipped with connectivity features that enable the devices to communicate with other electronic devices and/or networks. For example, multi-purpose electronic devices such as personal computers ("PCs") commonly communicate from time-to-time with a variety of other electronic devices, including but not limited to other PCs, servers, personal digital assistants, mobile phones, navigation devices, media players and/or media capture devices, home entertainment devices, printers, and faxes to perform various user-directed tasks.

A PC, for example, often presents a user interface via which a user can direct the performance of various tasks related to other, connected electronic devices. Often, the user interface for a particular device type is a generic interface (an interface provided for use with a particular operating system, for example) that is presented by the PC, despite the fact that a multitude of independent hardware vendors ("IHVs") may manufacture and/or distribute devices of a particular type. An IHV generally has to expend significant software design, development, and distribution effort and cost to provide customized, secure user interfaces for specific electronic devices or types thereof.

SUMMARY

Platforms and techniques for defining, distributing, authorizing/authenticating, and presenting dynamic device experiences are discussed herein. A dynamic device experience is presented when two electronic devices—referred to for exemplary purposes as first, or primary, and second, or secondary, electronic devices—are in communication via a communication medium. Characteristics of the secondary electronic device such as device type identifiers, hardware identifiers, software identifiers, or other information are used (by the primary electronic device, the secondary electronic device, or a networked server/service) to identify a number of hierarchically-related, declarative language data structures. The declarative language data structures are processed at runtime of the primary electronic device to present a graphical user interface to a user. The graphical user interface implements a dynamic device experience associated with the secondary electronic device. It will be understood that via the same or different communication medium or timeframe, a particular primary electronic device may also function as a secondary electronic device, and vice-versa. It will also be understood that both primary and secondary electronic devices may be multi-purpose or specific-purpose.

A first declarative language data structure (for example, a markup element or attribute) stores items of first data representing visible objects presentable via the graphical user interface. The visible objects themselves, which are optionally user-selectable, are configured to provide user experiences associated with a particular secondary electronic device. Examples of user experiences include but are not limited to: presentation of an aspect of the physical experience of a secondary electronic device; identification of a status of a secondary electronic device; identification of the source of a secondary electronic device (for example, a trademark, service mark, or logo of the manufacturer or distributor); presentation of an advertisement; control of a user-selectable function provided by a secondary electronic device; and control of a user-selectable function provided via a network-based service, which is associated a secondary electronic device and/or the source thereof. A second declarative language data structure stores items of second data that are usable to indirectly access particular resources (such as files, directories, devices, metadata, and computer programs) for providing particular user experiences. One or more additional declarative language data structures may store items of additional data usable to indirectly access configuration data, which is information (such as selection status/state, size, shape, position, color, memory/storage usage, images/associated metadata, and the like) used to present or access visible objects and/or resources.

In one exemplary implementation, the declarative language data structures are located within one or more device experience documents. Device experience documents store information collectively referred to as "device experience information." In one exemplary scenario, the device experience documents and/or device experience information are authored for particular electronic devices by one or more authoring entities to conform with predetermined syntax rules promulgated for particular declarative programming languages (for example, extensible markup language ("XML") schemas). Authoring entities may be the same or different entities as schema promulgating entities. The device experience documents and/or items of device experience information may be protected and/or verified using cryptographic schemes or techniques, such as digital signature schemes.

A distribution entity distributes device experience document(s) for a particular secondary electronic device to primary electronic devices and/or network-based services. At runtime of a primary electronic device, when communication with a secondary electronic device has been established, device experience documents are identified (and obtained and authenticated, if necessary) and processed to present a graphical user interface that implements a dynamic device experience for the second electronic device.

In this manner, hierarchical, declarative-language data structures are used to create secure, flexible-to-change user interfaces for individual IHVs/electronic devices, without the extensive programming, development, or distribution effort or cost usually associated with custom user interfaces. The user interfaces feature runtime indirection to dynamic targets, which increases efficiency and flexibility. When device experience information references external functionality such as Web services or software applications, a programmatic interaction between a secondary electronic device and such external functionality is brokered, which interaction may be used by a particular IHV (or others) to interact with the secondary device and to provide runtime extensibility of the device experience.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

The platforms and techniques for defining, authorizing/authenticating, distributing, and presenting dynamic device experiences discussed herein are based on the use of a number of hierarchically-related, declarative language data structures. In one possible implementation, the data structures are extensible markup language ("XML") elements or attributes located within one or more XML documents. The documents and data structures are processed at runtime of a primary electronic device to present a user interface that implements a dynamic device experience associated with a secondary electronic device, when the two devices are in communication via a communication medium. In one exemplary scenario, independent hardware vendors ("IHVs") are supported to create XML documents describing dynamic device experiences that capture consumer interest. The XML documents are verified against a predetermined schema, secured using a cryptographic technique such as a digital signature, and discovered/distributed in flexible, tamper-resistant manners.

For purposes of example, instance, or illustration—and not limitation—certain exemplary scenarios have been discussed herein. It will be understood, however, that other scenarios that involve, among other things, different electronic devices, user interface designs, authoring entities, schema promulgating entities, verifying entities, declarative programming languages, cryptographic techniques, and/or distribution entities, channels, or techniques are also possible without departing from the spirit or scope of the appended claims.

Figure 1:
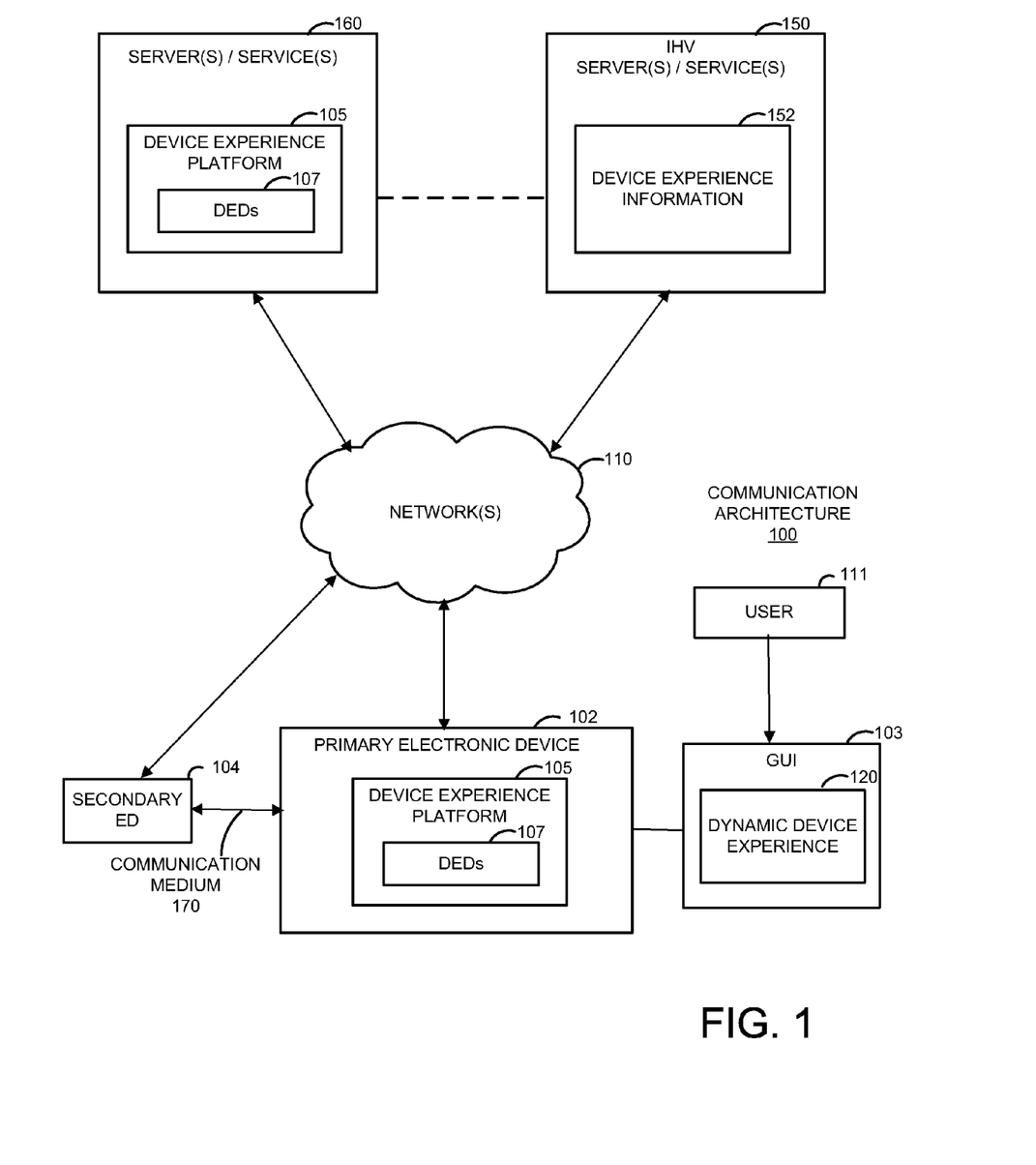
FIG. 1 is a simplified functional block diagram of communication architecture.

Turning now to the drawings, where like numerals designate like components, FIG. 1 is a simplified functional block diagram of an exemplary communication architecture 100, within which a device experience platform ("DEP") 105 (shown and described in more detail in connection with FIG. 2) may be implemented or used. As shown, aspects of DEP 105 are implemented within one or more servers/services 160 within networks(s) 110 and/or within primary electronic device 102.

Servers/services 160 and 150 represent any network-side implementations of systems or techniques described herein. For example, certain network-based servers may host a variety of services associated with DEP 105 (implemented using any desired infrastructure or technique, for example Web services), including but not limited to: data storage services; content authoring services; content verification services; content protection services; content distribution services; and/or general services such as e-commerce services, access to Web-based applications, customer service services, and the like.

Among other things, aspects of DEP 105 facilitate: the authoring of device experience information 152 (discussed in detail connection with FIG. 2) by authoring entities such as independent hardware vendors ("IHVs") or agents thereof (IHV servers/services 150 are shown); the verification and/or cryptographic securing of device experience information 152 to form device experience documents ("DEDs") 107 (described in more detail in connection with FIGS. 2 and 3); the distribution of DEDs 107 to primary electronic devices 102 and/or network-based servers/services; and the use of DEDs 107 by electronic devices, such as primary electronic device 102 and/or network-based servers/services, to present dynamic device experiences 120 (also described in more detail in connection with FIG. 2) to a user 111 via a graphical user interface ("GUI") 103.

From time-to-time two or more electronic devices such as primary electronic device 102 and secondary electronic device 104 communicate via a communication medium 170. Communication medium 170 may be any wired or wireless, wide-area or local-area, packet-switched or circuit-switched, one-way or two-way data transmission infrastructure, signal, or technology (including a communication medium existing in whole or in part within network(s) 110). In one possible scenario, electronic devices 102 and 104 are operated by the same user (as shown, user 111). In another possible scenario, electronic devices 102 and 104 are operated by different users.

Electronic devices 102 and 104 represent any known or later developed portable or non-portable consumer devices, including but not limited to: personal computers; telecommunication devices; personal digital assistants; media players; home entertainment devices (such as set-top boxes, game consoles, televisions, media gateways, and the like); in-vehicle devices; cameras; video recorders; and home servers. A particular electronic device may or may not be configured for communication via network(s) 110, although for exemplary purposes it is assumed that such communication is possible.

Networks 110 represent any existing or future, public or private, wired or wireless, wide-area or local-area, packet-switched or circuit-switched, one-way or two-way data transmission infrastructures, technologies, or signals. Exemplary networks 110 include: the Internet; managed WANs (for example, cellular networks, satellite networks, fiber-optic networks, co-axial cable networks, hybrid networks, copper wire networks, and over-the-air broadcasting networks such as television, radio, and datacasting networks); wireless local area networks; and personal area networks.

When two electronic devices are in communication via communication medium 170, one device (referred to herein for discussion purposes as the primary electronic device—as shown, electronic device 102) presents graphical user interface 103 that implements dynamic device experience 120 associated with the other device (referred to herein as the secondary electronic device—as shown, electronic device 104). One or more DEDs 107 are dynamically processed (by an electronic device such as the primary electronic device, the secondary electronic device, or a network-based server) to present the dynamic device experience. It will be understood that via the same or different communication medium or timeframe, a particular primary electronic device may also function as a secondary electronic device, and vice-versa, and that both primary and secondary electronic devices may be multi-purpose or specific-purpose.

Figure 2:
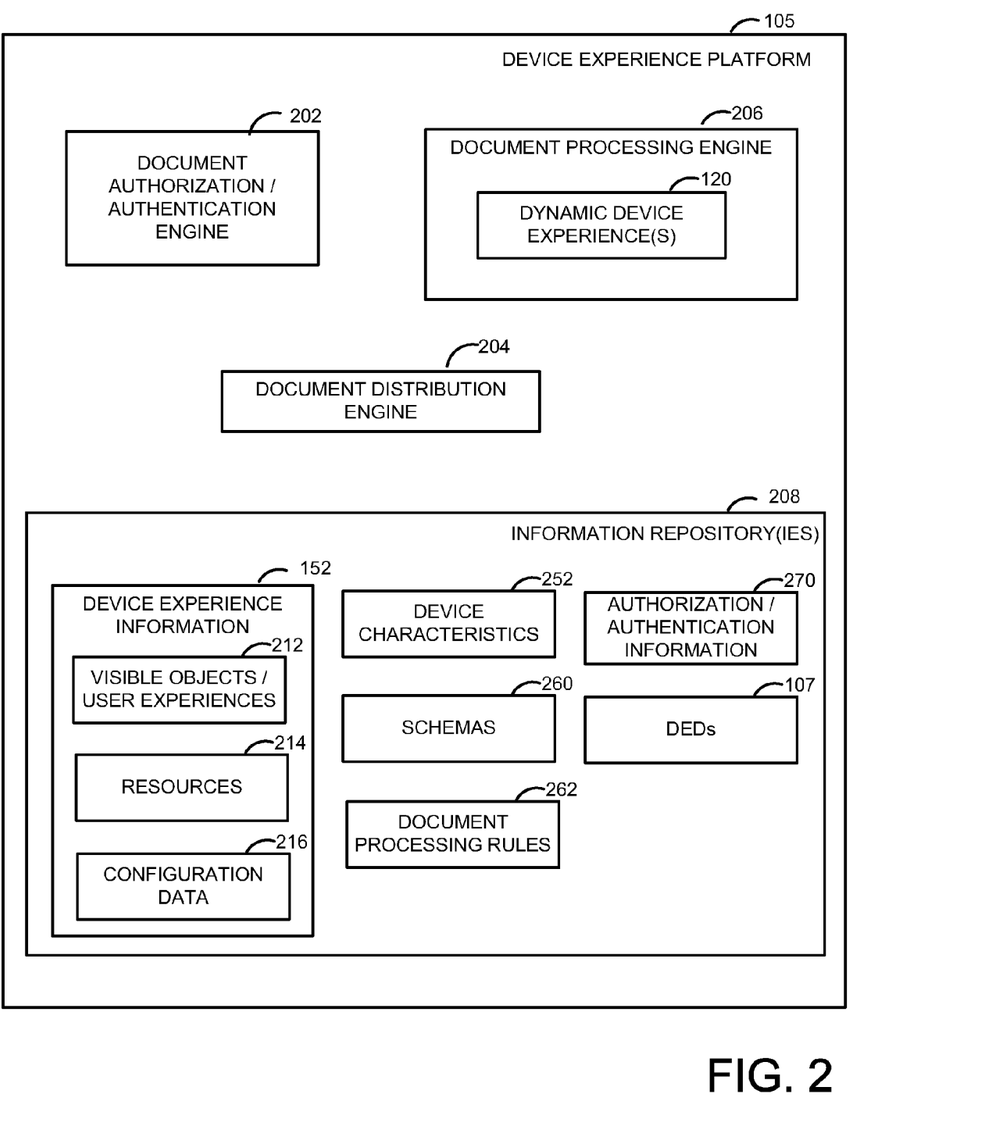
FIG. 2 is a simplified functional block diagram of the device experience platform shown in FIG. 1.

With continuing reference to FIG. 1, FIG. 2 is a simplified functional block diagram of DEP 105 shown in FIG. 1. Aspects of DEP 105 may be implemented within network(s) 110, by one or more servers/services 160 and/or 150, for example, and/or implemented within electronic devices, such as electronic devices 102 and/or 104. An aspect of a network-based DEP 105 may be implemented as a network-side computer program such as a Web service, for example. Because the architecture of DEP 105 is flexible, however, various functions can be performed using network-side processing, client-side processing, or a combination thereof. In general, design choices and/or operating environments dictate how and whether specific functions of DEP 105 are implemented. Such functions may be implemented using hardware, software, firmware, or combinations thereof. Particular configurations of DEP 105 may include fewer, more, or different components than those described. It will further be understood that computer programs that implement communication-related functions of DEP 105 may operate at any layer of a communication protocol stack.

As shown, DEP 105 includes: a document authorization/authentication engine 202; a document distribution engine 204; a document processing engine 206 for generating dynamic device experiences 120; and information repository(ies) 208, which store, among other things, device experience information 152 (including but not limited to visible objects/user experiences 212, resources 214, and configuration data 216), device experience documents 107, device characteristics 252, schemas 260, document processing rules 262, and authorization/authentication information 270.

Information repository(ies) 208 represent general data storage capability for information relating to DEP 105. Information repositories 208 may be implemented using various types and arrangements of computer-readable media 604 (discussed further below, in connection with FIG. 6).

Schemas 260 represent frameworks that facilitate organization and interpretation of device experience information 152. An exemplary schema is an XML schema, to which the syntax of the data structures (for example, elements and attributes) of a particular XML document conform. At a high level, an XML schema includes: (1) a global element declaration, which associates an element name with an element type, and (2) a type definition, which defines attributes, sub-elements, and character data for elements of that type. Attributes of an element specify particular properties of the element using a name/value pair, with one attribute generally specifying a single element property. Various schemas 260 are available and/or definable for XML, and any desirable schema promulgating entity may define and/or provide a schema.

DEDs 107 represent sets of declarative language instructions that define a number of data structures that conform to schemas 260 defined for the particular declarative programming language. As noted above, one exemplary declarative programming language is extensible markup language ("XML"), although any known or later developed declarative programming language is possible. Exemplary data structures 303, 313, and 323 are shown and discussed in connection with FIG. 3.

Device experience information 152 represents information that specifies the relationships between data in source material through the use of declarative language data structures associated with DEDs 107. Generally, device experience information 152 is provided by an authoring entity and validated for legal syntax against one or more schemas 260. Source material associated with particular electronic devices generally (but not necessarily) resides with independent hardware vendors ("IHVs") that manufacture and/or distribute such devices, and includes but is not limited to computer programs, interfaces, and the like. Device experience information 152 may be stored in temporary or persistent memory locations of one or more computing systems or operating environments.

In one exemplary scenario, the authoring entity of device experience information 152 is an IHV. In the exemplary scenario, the IHV populates a number of declarative language data structures, such as XML elements or attributes thereof, with items of data that are used to define certain visible objects/user experiences 212, resources 214, and configuration data 216 that are used to present a graphical user interface associated with a particular secondary electronic device or type thereof. The graphical user interface is presented by a primary electronic device to provide a dynamic device experience associated with the secondary electronic device. The IHV may reference third party material (including other device experience documents or portions thereof), and/or third parties may be authoring entities. For example, other device experience documents or portions thereof may be referenced, via their respective unique identifiers (for example task group identifiers and/or specific tasks within the group(s)). At runtime, the primary electronic device incorporates the information from the referenced dynamic experience documents into the particular dynamic device experience being presented. Exemplary data structures 303, 313, and 323, and items of data 305, 315, and 325 stored respectively therein are shown and discussed in connection with FIG. 3.

Visible objects/user experiences 212 represent physical or logical presentation tools or controls in the form of items presentable via graphical user interface 103 (such as graphics, images, text, audio clips, video clips, and the like). Visible objects/user experiences 212 provide experiences associated with a particular secondary electronic device. Examples of experiences include but are not limited to: presentation of an aspect of the physical appearance of the secondary electronic device; identification of a status of the secondary electronic device (such as number of messages received, communication status, task performance status, idle status, on/off status, battery life status, and the like); identification of the source of the secondary electronic device (for example, a trademark, service mark, or logo of the manufacturer or distributor of the secondary electronic device); presentation of an advertisement; control of a user-selectable function provided by the secondary electronic device (for example, a wallpaper editor, a ringtone editor, invoking a modem function, media discovery/management, media synchronization, and the like); or control of a user-selectable function provided via a network-based service (such as an Internet-based service, an Internet-based software application, or a Web page) that is associated with the secondary electronic device and/or the source thereof. Certain visible objects/user experiences 212 are selectable by the user of the primary electronic device to navigate to other visible objects/user experiences or to access resources 214 (discussed further below). As shown and discussed in connection with FIG. 3, references to visible objects/user experiences 212 are stored as items of first data 305 in a first declarative language data structure 303.

Resources 214 represent resources such as files, directories, metadata, or computer programs that implement (or arrange to implement) internal or external functionality, which are accessible for providing visible objects/user experiences 212 associated with a particular secondary electronic device. Resources 214 may be, or may refer to, special instructions to permit a programmatic interaction between a primary or secondary electronic device and network-based services, such as Web services, at runtime. This permits entities such as IHVs to directly interact with electronic devices via Web applications, and provides a means for authenticated and authorized runtime extensibility of the dynamic device experience. Resources 214 (or references thereto, such as URLs, pointers, or vectors) may be considered to be device experience information 152, stored within DEDs 107. Alternatively, resources 214 may be stored separately from DEDs 107 but referenced therein. As shown and discussed in connection with FIG. 3, references (such as URLs, pointers, or vectors) to resources 214 are stored as items of second data 315 in a second declarative language data structure 313.

Configuration data 216 represents information used to present or access visible objects/user experiences 212 and/or resources 214, such as selection status/state, size, shape color, memory/storage usage, images/associated metadata, and the like. As shown and discussed in connection with FIG. 3, references to configuration data 216 may be stored as items of third data 325 in a third declarative language data structure 323.

Referring again to information repository(ies) 208 shown in FIG. 2, authorization/authentication information 270 represents information that is used by document authorization/authentication engine 202 (discussed below) to (1) verify that DEDs 107 based on certain device experience information 152 are approved for distribution and/or conform to predetermined syntax rules, such as schemas 260; and (2) verify the authenticity of device experience documents 107 and/or device experience information 152 prior to use by a particular primary electronic device. Verification for both purposes (1) and (2) may involve the use of one or more cryptographic schemes or techniques, such as a digital signature schemes, and may be performed at one or more times by one or more verifying entities. Authorization/authentication information 270 includes but is not limited to algorithms, schemas, digital certificates, keys, and the like.

Device characteristics 252 represent information about particular secondary electronic devices 104 with which device experience documents 107 are associated. Device characteristics 252 are used to identify appropriate DEDs 107 for distribution and/or use to present dynamic device experiences 120 associated with particular secondary electronic devices. Examples of device characteristics 252 include but are not limited to information about a particular electronic device or class thereof, such as a device type identifier, a model identifier, a unique device identification number, a hardware identifier (such as a processing capability identifier, a display capability, a memory/storage capability, and the like), a network connectivity capability, or a software identifier (such as a software version identifier, an identifier associated with a particular DED 107, and the like).

Document processing rules 262 represent instructions used by a network- or client-side document processing engine 206 (discussed below) for processing DEDs 107 at runtime of a particular primary electronic device, to present a dynamic device experience 120 associated with a particular secondary electronic device.

Referring again to DEP 105 depicted in FIG. 2, document authorization/authentication engine 202 is responsible for using authorization/authentication information 270 to: (1) verify that DEDs 107 are approved for distribution and/or conform to predetermined syntax rules, such as schemas 260; and/or (2) verify the authenticity of DEDs 107 prior to use by a primary electronic device. As such, aspects of document authorization/authentication engine 202 may be hosted by one or more network- or client-based DEPs 105, and may operate at various points in the distribution chain of DEDs 107 and/or runtime processing of DEDs 107. In an exemplary scenario, prior to distribution and/or use of DEDs 107, DEDs 107 are presented to a verifying entity (note that depending on the stage of distribution, the verifying entity may be different—exemplary verifying entities include but are not limited to a trusted network-based server or service and the primary electronic device itself.) The verifying entity verifies that the DEDs 107 conform to one or more established schemas 260 and/or originate from a trusted source.

Verification of DEDs 107 may involve the use of a cryptographic protection technique, such as the application or verification of a digital signature. A digital signature cryptography scheme generally involves three algorithms—a key generation algorithm (implemented by a third party key generation service or certificate authority) that produces a "key pair," which includes a verifying key (generally a public key) and a signing key (generally a private key); a signing algorithm that takes signed information and the signing key as inputs and outputs a digital signature (such as digital signature 370, shown and discussed in connection with FIG. 3), which is an object that can be embedded inside of a data structure such as DEDs 107 or portions thereof; and a signature verifying algorithm (implemented by a networked server/service or electronic device) that takes signed information, the verifying key, and a digital signature, and either verifies or rejects the digital signature. An entity's public key (which may be used for purposes other than digital signatures, such as public-key encryption) is tied to the entity by a digital identity certificate issued by a certificate authority. An entity's identification information (for example, name, address, phone number, and the like) is bound to the public key, and the public key is used as a form of identification.

Referring again to DEP 105 depicted in FIG. 2, document distribution engine 204 is responsible for identifying particular DEDs 107 for distribution and/or use. DEDs 107 for a particular secondary electronic device may be identified and distributed to primary electronic devices and/or network-based servers/services that are configured to process DEDs 107 and arrange for their presentation via graphical user interfaces that implement dynamic device experiences of a particular secondary electronic device. Distribution may occur prior to, or at the time of, such use. DEDs 107 may be distributed on a push or pull basis using any desired communication network, protocol, or technique. In an exemplary scenario, DEDs 107 (generally, DEDs 107 that have been verified by a verifying entity and optionally protected using a cryptographic technique such as a digital signature) usable to present a particular dynamic device experience for a particular secondary electronic device or type thereof are distributed by a distribution entity, who is responsible for making the DEDs available to users of primary electronic devices and/or network-based servers/services. The distribution entity may be any desired entity, including but not limited to individual IHVs, users or primary or secondary electronic devices (in the case of peer-to-peer content sharing, for example), or one or more other trusted entities, such as operators of trusted network-based services. In the exemplary scenario, a Web service is used to bind particular DEDs 107 to particular secondary electronic devices, and to automatically pre-distribute DEDs 107 to users of primary electronic devices.

Referring again to DEP 105 depicted in FIG. 2, document processing engine 206 facilitates presentation of dynamic device experiences 120 associated with particular secondary electronic devices by using document processing rules 262 to process DEDs 107 at runtime of a particular primary electronic device (generally when communication with a particular secondary electronic device, with which DEDs 107 are associated, has been established) to present a graphical user interface. Any known or later developed technique for processing declarative language documents may be utilized, and such processing may be network- or client-side processing.

Figure 3:
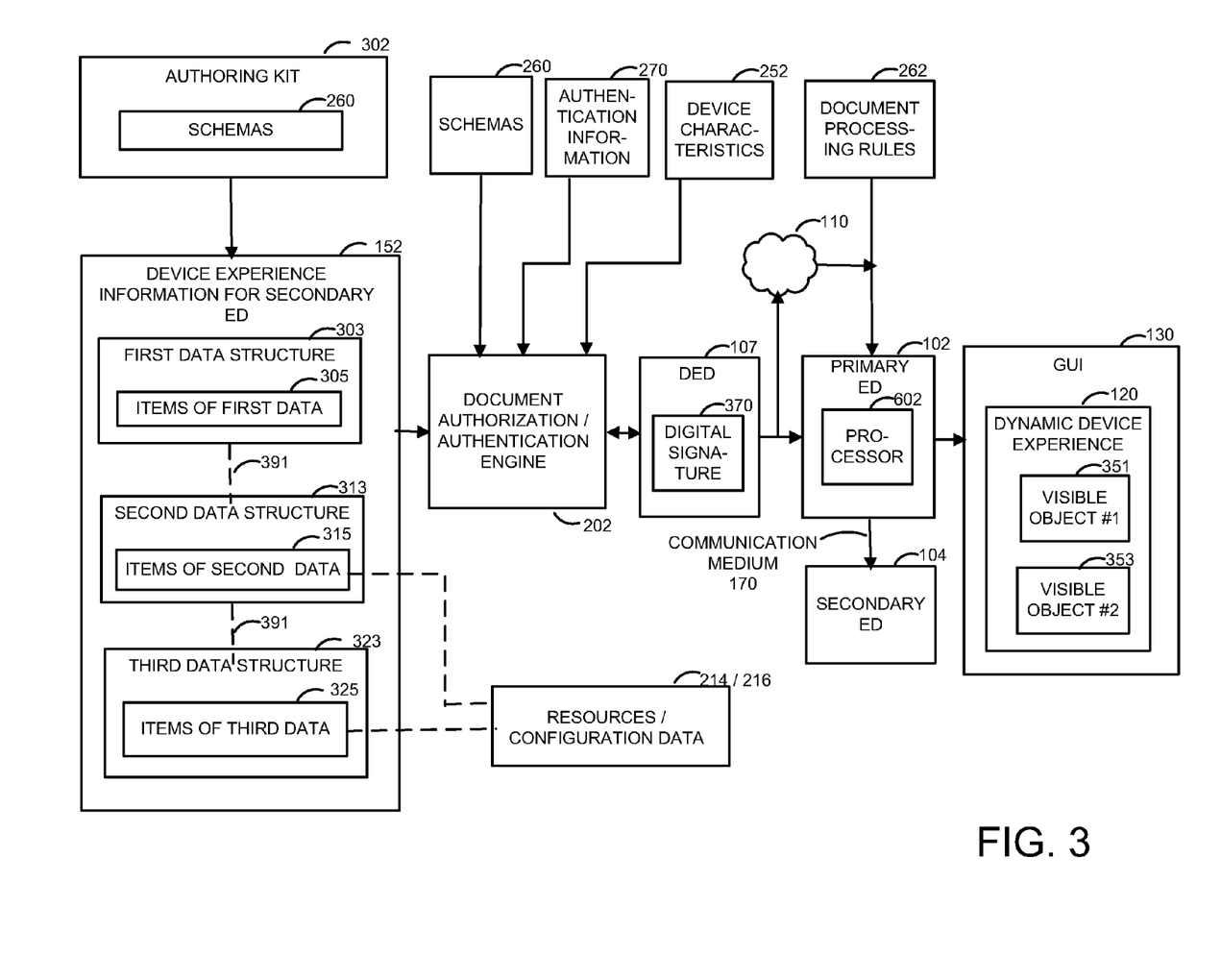
FIG. 3 is a simplified functional block diagram illustrating an exemplary distributed system for authoring, authorizing/authenticating, distributing, and presenting dynamic device experiences, aspects of which may be implemented by or used with components of the communication architecture shown in FIG. 1 and/or the device experience platform shown in FIG. 2.

With continuing reference to FIGS. 1 and 2, FIG. 3 is a simplified functional block diagram illustrating aspects of an exemplary distributed system for authoring, authorizing/authenticating, distributing and presenting (via primary electronic device 102) dynamic device experiences associated with secondary electronic device 104. Aspects of the distributed system may implement, be implemented by, or use aspects of communication architecture 100 and/or DEP 105.

As shown, an authoring kit 302 is used by an authoring entity (not shown), such as an IHV, to populate a number of declarative language data structures 303, 313, and 323, such as XML elements or attributes thereof that conform to one or more schemas 260, with items of data 305, 315, and 325, respectively, to form device experience information 152. Device experience information 152 is generally bound to individual types or classes of secondary electronic devices.

First declarative language data structure 303 stores items of first data 305, such as strings or numeric values, representing visible objects/user experiences 212 presentable via graphical user interface 103. Two visible objects are shown, visible object #1 351 and visible object #2 353.

The visible objects themselves, which are optionally user-selectable, are presentation tools or controls such as graphics, images, text, audio clips, video clips, and the like, which are configured to provide dynamic device experience 120 associated with secondary electronic device 104. Examples of user experiences include but are not limited to: presentation of an aspect of the physical appearance of the secondary electronic device; identification of a status of the secondary electronic device; identification of the source of the electronic device (for example, a trademark, service mark, or logo of the manufacturer or distributor of the secondary electronic device); presentation of an advertisement; control of a user-selectable function provided by the secondary electronic device; and control of a user-selectable function provided via a network-based service, which is associated with the secondary electronic device and/or the source thereof.

In an exemplary scenario, visible object #1 351 identifies a source of secondary electronic device, and visible object #2 353, which is user-selectable, provides control of a function of secondary electronic device 104, such as getting messages, synchronizing or discovering content, accessing network-based services or applications, and the like. Visible object #1 351 is represented by a particular item of first data 305. Visible object #2 353 is represented by a different item of first data 305.

A second declarative language data structure 313 stores items of second data 315 (for example, pointers, vectors, or URLs) that are usable to indirectly access particular resources 214 for providing user experiences associated with secondary electronic device 104. As discussed above, resources 214 include but are not limited to files, directories, devices, metadata, and computer programs that implement (or arrange to implement) functionality of the electronic device or external functionality such as Internet-based services or software applications.

In the exemplary scenario, different items of second data 315, which are hierarchically associated with respective items of first data 305, reference one or more resources 214 (for example, images, graphics, text, video, or audio) for implementing visible objects #1 351 and #2 353. In addition, a particular item of second data 315 references (the item of second data may be a URL, vector, or pointer, for example) one or more resources 214 (for example, a computer program) that are responsible for performing, or arranging for performance of, the function of the secondary electronic device that is user-electable via visible object #2 353. Upon user selection of visible object #2 353, the resource(s) are indirectly accessed via the item(s) of second data 315, and the resource access results in the secondary electronic device performing the function. Communication with primary electronic device 102 and/or a network-based server/service regarding performance of the function may also occur.

Configuration data 216 may be stored and indirectly accessed using one or more additional declarative language data structures and stored data items, such as third data structure 323 and items of third data 325.

Referring again to FIG. 3, in an exemplary scenario device experience information 152 for secondary electronic device 104 is submitted to a verifying entity (not shown) such as a network-based operator of document authorization/authentication engine 202—for example, the operator of a Web service that implements aspects of the functionality of authorization/authentication engine 202. Document authorization/authentication engine 202 verifies that device experience information 152 conforms to an established schema 260 and/or identifies certain authentication information 270 and/or device characteristics 252 associated with secondary electronic device 104 to ensure that device experience information 152 originates from a trusted source and that it is matched to the correct device within a device category. Once verified, device experience information 152 is referred to for discussion purposes as (one or more) DEDs 107.

DEDs 107 and/or items of device experience information 152 may be protected using cryptographic schemes or techniques. In the exemplary scenario, DEDs 107 and device experience information 152 therein are protected using a digital signature scheme to reduce the likelihood of tampering and to enable ease of revocation and replacement of the DEDs 107. In accordance with the exemplary digital signature scheme, after authoring, device experience documents and portions thereof are signed with digital signature 370 by a signing entity (not shown), which may be the verifying entity or a different trusted entity. Signed DEDs 107 may be stored in one or more information repositories, including but not limited to portable computer-readable storage media such as CDs, flash memories, or DVDs, and temporary or persistent storage associated with electronic devices or servers.

A distribution entity (not shown) distributes DEDs 107. DEDs 107 may be distributed to primary electronic device 102 and/or services within network(s) 110. DED distribution may occur on a push or pull basis, prior to or after communication is established between secondary electronic device 104 and primary electronic device 102 that presents graphical user interface 103. The distribution entity may be any desired entity, including but not limited to an individual IHV, a trusted network-based service, a user of the secondary device, or one or more other trusted entities. Likewise, the distribution medium may be any known or later developed communication network or technique and/or computer-readable storage medium. In an exemplary scenario, a Web service is used to automatically pre-distribute DEDs 107 to primary electronic devices.

Prior to use, signed DEDs 107 (and/or primary or secondary electronic devices) may be authenticated. In the exemplary scenario, authentication may include, among other things, use of a signature verifying algorithm to either verify or reject digital signature 370. Generally, a signature verifying algorithms accepts a public key-along with the digital signature and the purportedly signed information-and either verifies or rejects the digital signature. Authentication information 270 in the form of the key and/or signature verifying algorithm may be provided to or by primary electronic device 102 or a separate network-based verification server or service (such as a network-based operator of document authorization/authentication engine 202). Device characteristics 252 may also be used to ensure that DEDs 107 for the appropriate secondary electronic device have been identified.

At runtime, when communication between primary electronic device 102 and secondary electronic device 104 has been established via communication medium 170, appropriate DEDs 107 are identified via the use of device characteristics 252 (and DEDs 170 are obtained and authenticated, if necessary), and items of data 305, 315, and 325 stored within first, second, and third declarative language data structures 303, 313, and 323, respectively, are processed to present graphical user interface 103 that implements dynamic device experience 120 for secondary electronic device 104.

In accordance with one exemplary implementation, a particular IHV's brand images may be integrated with familiar and coherent experiences. Graphical user interface 103 may implement dynamic device experience 120 differently depending on the connection status of primary and secondary electronic devices 102 and 104, respectively, or other dynamic or user-selectable conditions. For example, an intuitive interface may be provided when secondary electronic device 104 is initially in communication with primary electronic device 102 via communication medium 170 (for example, upon initial communication between the two devices, or upon certain communication time intervals). In an exemplary scenario, the intuitive interface displays a certain set of visible objects/user experiences 212, including but not limited to: an image of secondary electronic device 104; branding information associated with the IHV that manufactures and/or distributes secondary electronic device 104; a status (for example, idle, getting messages, etc.) of secondary electronic device 104; a list of user-selectable functions of secondary electronic device 104; and a list of accessible network-based services and/or applications. When subsequent communications between secondary electronic device 104 and primary electronic device 102 occur (as may be the case during daily use, for example), a different set of visible objects/user experiences 212 may be displayed by primary electronic device 102. In the exemplary scenario, this set is implemented by an easily-visible device toolbar that may include user-selectable functions of secondary electronic device 104 as well as branding elements, and may be displayed in a manner (such as via a taskbar) that is similar to the manner in which the functions of primary electronic device 102 are displayed.

With continuing reference to FIGS. 1-3, FIG. 4 is a flowchart of an exemplary method for providing a dynamic device experience associated with an electronic device such as secondary electronic device 104. The method illustrated in FIG. 4 may be implemented by computer-executable instructions, such as computer-executable instructions associated with document authorization/authentication engine 202 and/or document distribution engine 204, which are stored in a computer-readable medium 604 and executed by one or more general, multi-purpose, or single-purpose processors, such as processor 602. Unless specifically stated, the method is not constrained to a particular order or sequence. In addition, some of the method or steps thereof can occur or be performed concurrently and/or repeatedly.

Figure 4:
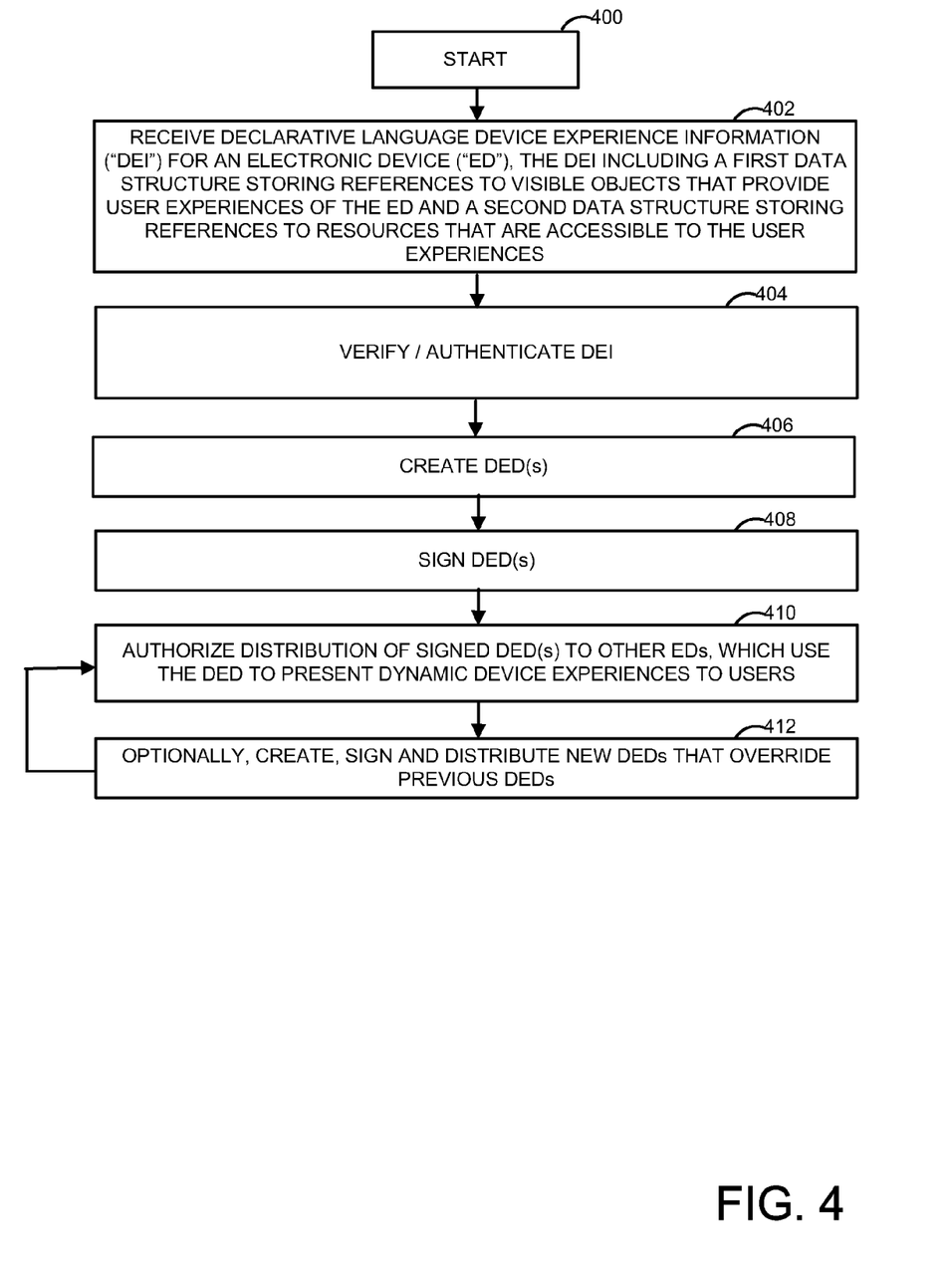
FIG. 4 is a flowchart of a method for providing a dynamic device experience associated with an electronic device such as the secondary electronic device shown in FIG. 1.

The method illustrated in FIG. 4 is described in general terms, specific terms and techniques having been previously described in detail in connection with FIGS. 1-3. The method begins at block 400 and continues at block 402, where declarative language device experience information ("DEI") for an electronic device, such as device experience information 152 for secondary electronic device 104, is received. The DEI includes a first data structure, such as first data structure 303, storing references (such as items of first data 305) to visible objects, such as visible object #1 351 and visible object #2 353, which provide user experiences 212 of the electronic device. The DEI also includes a second data structure, such as second data structure 313, storing references (such as items of second data 315) to resources, such as resources 214, which are indirectly accessible to implement the user experiences. In the exemplary scenario, the first and second data structures are XML elements or attributes.

The DEI referred to in block 402 is verified and/or authenticated at block 404, and upon verification/authentication, declarative language documents ("DEDs"), such as DEDs 107, are created, as indicated at block 406. The DEDs and/or portions thereof are cryptographically protected (for example, signed using a digital signature) as indicated at block 408. Distribution of protected DEDs to other electronic devices (such as primary electronic device and/or network-based servers or services) is authorized at block 410. Such other electronic devices process the DEDs at runtime to present dynamic device experiences to users. DED distribution may occur on a push or pull basis, prior to or after communication is established between the electronic device with which the DED is associated and other electronic devices that present dynamic device experiences based thereon. In one possible scenario, URLs to particular DEDs or DED distribution services may be provided to users of electronic devices, which can be used to retrieve authorized and/or authenticated DEDs. Optionally, as indicated at block 412, new DEDs that override previous DEDs may be created, signed, and distributed as they become available.

With continuing reference to FIGS. 1-4, FIG. 5 is a flowchart of a method for presenting a graphical user interface, such as graphical user interface 103, which implements a dynamic device experience associated with an electronic device, such as dynamic device experience 120 associated with secondary electronic device 104. The method illustrated in FIG. 5 may be implemented by computer-executable instructions, such as computer-executable instructions associated with document processing engine 206, which are stored in a computer-readable medium 604 and executed by one or more general, multi-purpose, or single-purpose processors, such as processor 602 (which in turn may be a component of an electronic device such as primary electronic device 102 or a networked server). Unless specifically stated, the method is not constrained to a particular order or sequence. In addition, some of the method or steps thereof can occur or be performed concurrently and/or repeatedly.

Figure 5:
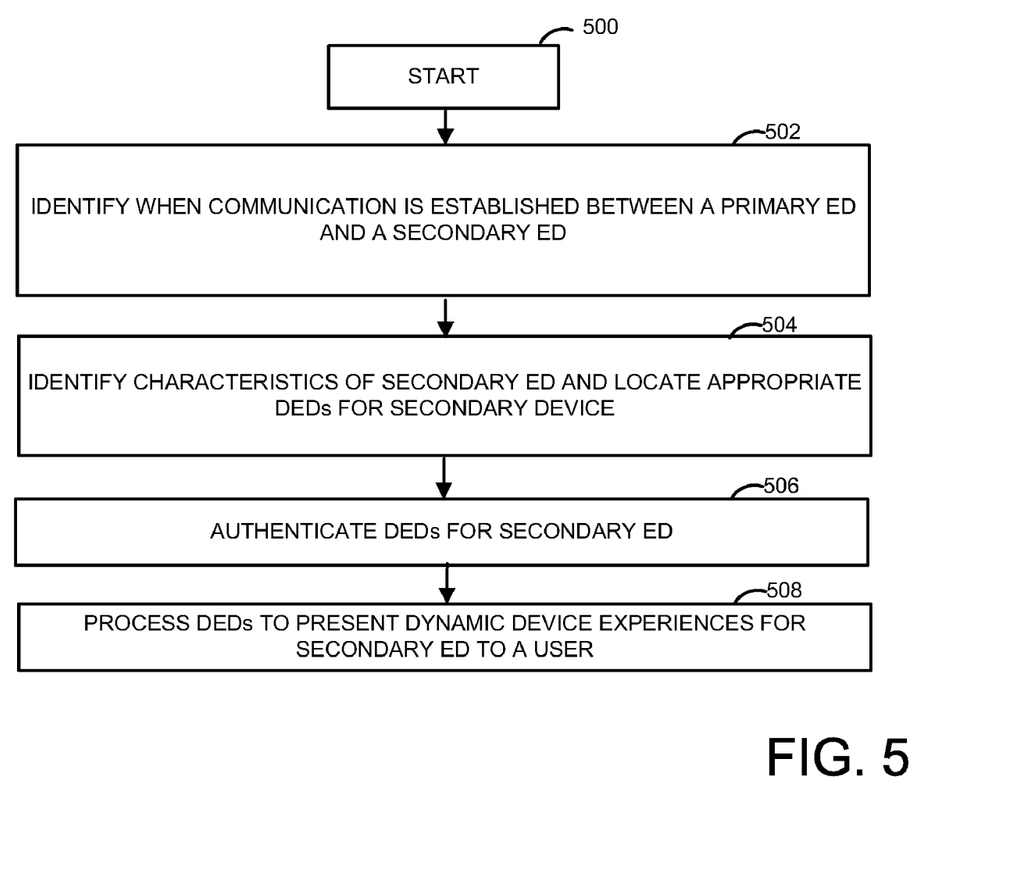
FIG. 5 is a flowchart of a method for presenting a graphical user interface that implements a dynamic device experience associated with an electronic device such as the secondary electronic device shown in FIG. 1.

The method illustrated in FIG. 5 is described in general terms, specific terms and techniques having been previously described in detail in connection with FIGS. 1-3. The method begins at block 500 and continues at block 502, where it is identified when communication is established between a primary electronic device and a secondary electronic device. Generally, the primary electronic device presents a dynamic device experience associated with the secondary electronic device when the two devices are in communication via a communication medium such as communication medium 170.

At block 504, characteristics of the secondary electronic device are identified, and appropriate DEDs are located. Generally, the primary and/or secondary electronic device identifies and uses characteristics of the secondary electronic device such as device type identifiers, hardware identifiers, software identifiers, DED identifiers, or other information to identify appropriate DEDs 107. DEDs 107 or references thereto may be located in various places, such as local computer-readable media and network-based computer-readable media. As indicated at block 506, DEDs associated with the secondary electronic device may be authenticated prior to being processed, at block 508, to present the dynamic device experience for the secondary electronic device to a user. In the exemplary scenario, at least two visible objects, which are represented by items of first data 305, are presented to the user. Items of second data 315 such as pointers, URLs, or vectors are usable to indirectly access resources 214 associated with the visible objects.

In this manner, hierarchical, declarative-language data structures are used to create secure, flexible-to-change user interfaces for individual electronic devices, without the extensive programming, development, or distribution effort or cost usually associated with custom user interfaces. The user interfaces feature runtime indirection to dynamic targets, which increases efficiency and flexibility. When device experience information (resources 214 or references thereto, for example) references external functionality such as Web services or software applications, a programmatic interaction between a secondary electronic device and such external functionality is brokered, which may be used by a particular IHV (or others) to interact with an electronic device and to provide runtime extensibility of the device experience.

With continuing reference to FIGS. 1-5, FIG. 6 is a simplified functional block diagram of an operating environment 600 with which the platforms and techniques discussed herein for defining, authorizing/authenticating, distributing, and presenting dynamic device experiences may be implemented or used. Operating environment 600 is indicative of a wide variety of general-purpose, special-purpose, client- or server-based, stand-alone or networked computing environments.

Figure 6:
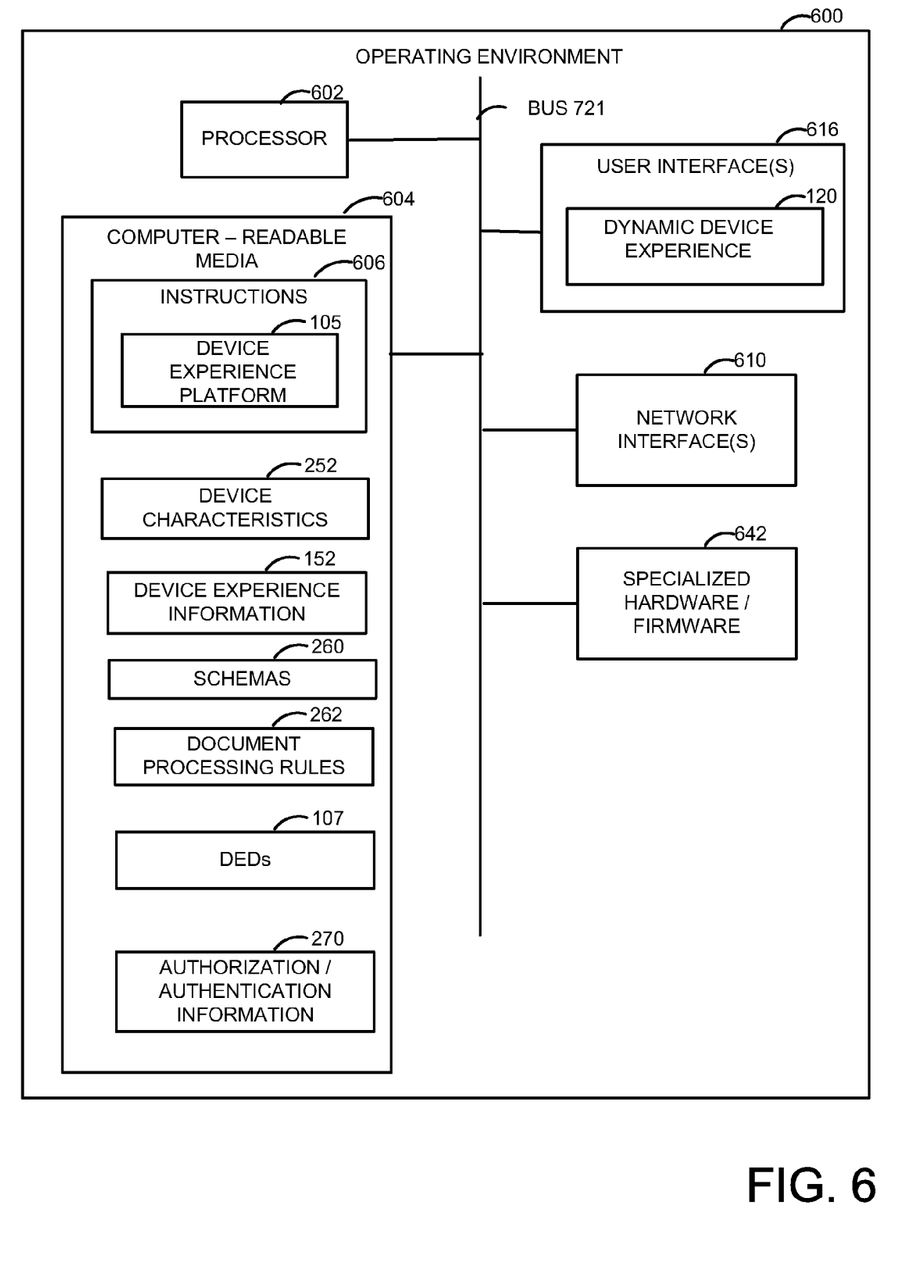
FIG. 6 is simplified functional block diagram of an exemplary operating environment with which aspects of the device experience platform shown in FIG. 2, the distributed system shown in FIG. 3, and/or the methods shown in FIGS. 4 and 5 may be implemented or used.

One or more components shown in FIG. 6 may be packaged together or separately to implement functions of operating environment 600 (in whole or in part) in a variety of ways. As shown, a bus 621 carries data, addresses, control signals and other information within, to, or from computing environment 600 or components thereof.

Network interface(s) 610 are one or more physical or logical elements that enhance the ability of operating environment 600 to receive information from, or transmit information to, another operating environment (not shown) via a communication medium such as communication medium 170. Examples of communication media include but are not limited to: wireless or wired signals; computer-readable media (such as computer-readable media 604, discussed further below); computer-executable instructions (such as computer-executable instructions 606, discussed further below); communication hardware or firmware; and communication protocols or techniques.

Specialized hardware/firmware 642 represents any hardware or firmware that implements functions of operating environment 600. Examples of specialized hardware/firmware 142 include encoder/decoders ("CODECs"), decrypters, application-specific integrated circuits, secure clocks, and the like.

A processor 602, which may be one or more real or virtual processors, controls functions of operating environment 600 by executing computer-executable instructions 606 (discussed further below).

Computer-readable media 604 represent any number and combination of local or remote components, in any form, now known or later developed, capable of recording, storing, or transmitting computer-readable data, such as instructions 606 (discussed further below) executable by processor 602 and data such as device characteristics 252, device experience information 152, schemas 260, document processing rules 262, device experience documents 107, and authorization/authentication information 270. In particular, computer-readable media 604 may be, or may include: a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 604 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 606 represent any signal processing methods or stored instructions that electronically control predetermined operations on data. In general, computer-executable instructions 606 are implemented as software programs according to well-known practices for component-based software development, and encoded in computer-readable media (such as one or more types of computer-readable media 604). Software programs may be combined or distributed in various ways.

Component engines of device experience platform 105 are examples of software programs. Other examples of software programs include but are not limited to operating systems (not shown) and end-user software programs (not shown) such as media organizing applications, media player applications, email applications, anti-malware applications, and the like. In one possible implementation, an operating system supports components of device experience platform 105.

User interface(s) 616 represent a combination of presentation tools and controls that define the way a user interacts with a particular application or device. One type of user interface 616 is graphical user interface 103, although any known or later developed type of user interface is possible. Presentation tools are used to receive input from, or provide output to, a user. An example of a physical presentation tool is a display such as a monitor device. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function as an interface for both inputs to, and outputs from, a user.

Various aspects of a platform and techniques for defining, authorizing/authenticating, distributing, and presenting dynamic device experiences have been described. It will be understood that all of the described components/elements need not be used, nor must the components/elements, when used, be present concurrently. Elements/components described as being computer programs are not limited to implementation by any specific embodiments of computer programs, and rather are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium encoded with computer-executable instructions which, when executed by a processor, perform a method for presenting a graphical user interface, the method comprising:

identifying when communication is established between a first electronic device and a second electronic device via a communication medium;

identifying one or more characteristics of the second electronic device; based on the one or more identified characteristics, identifying a plurality of data structures conforming to syntax rules defined for a declarative programming language, the plurality of data structures including a first data structure storing items of first data, a particular item of first data representing a visible object presentable via a graphical user interface of the first electronic device, the visible object configured to provide a user experience associated with the second electronic device, and a second data structure hierarchically associated with the first data structure, the second data structure storing items of second data, a particular item of second data usable to indirectly access a particular resource for providing a particular user experience associated with the second electronic device; and after communication is established between the first electronic device and the second electronic device, arranging for the first electronic device to use the identified data structures to display a graphical user interface to a user;

wherein a user experience is selected from the group comprising: presentation of an aspect of the physical appearance of the second electronic device; identification of a status of the second electronic device; identification of a source of the second electronic device; presentation of an advertisement; control of a user-selectable function provided via the second electronic device; and control of a user-selectable function provided via a network-based service.

2. The computer-readable storage medium according to claim 1, wherein the step of arranging for the first electronic device to use the identified data structures to display a graphical user interface to a user comprises identifying a first item of first data representing a first visible object operable to provide an identification of a source of the second electronic device, identifying a second item of first data representing a second, user-selectable, visible object operable to provide control of a function of the second electronic device, based on the second item of first data, identifying a particular item of second data usable to indirectly access a particular resource for controlling a function of the second electronic device, based on the first and second items of first data, arranging for the first electronic device to display the first visible object and the second visible object via the graphical user interface, upon user selection of the second visible object via the graphical user interface, using the particular item of second data to indirectly access the particular resource, and based on the resource access, arranging, via the first electronic device, for the second electronic device to perform the function.

3. The computer-readable storage medium according to claim 2, wherein the method further comprises:

arranging for the first electronic device to display a status of the performance of the function via the graphical user interface.

4. The computer-readable storage medium according to claim 1, wherein a particular resource is selected from the group comprising: a file; a directory, a device; metadata; and a set of computer-executable instructions, and wherein when the particular resource comprises a set of computer-executable instructions, the set of computer-executable instructions is selected from the group comprising: a computer program which, when executed, performs a function of the second electronic device; a computer program which, when executed, performs a function of the first electronic device; and a network-based computer program.

5. The computer-readable storage medium according to claim 1, wherein a particular item of second data comprises a reference to a location of a particular resource, and wherein the reference is selected from the group comprising: a pointer; a uniform resource locator; and a vector.

6. The computer-readable storage medium according to claim 1, wherein the plurality of data structures further include a third data structure hierarchically associated with the first data structure or the second data structure or both, the third data structure storing items of third data usable to indirectly access one or more items of configuration data, the one or more items of configuration data associated with a particular visible object or a particular resource for implementing a particular user experience or both.

7. The computer-readable storage medium according to claim 1, wherein one or more of the identified plurality of data structures are included in one or more device experience documents, and wherein the one or more device experience documents comprise one or more extensible markup language ("XML") documents.

8. The computer-readable storage medium according to claim 1, wherein the processor is associated with an electronic device selected from the group comprising: the first electronic device; the second electronic device; and a network-based electronic device.

9. The computer-readable storage medium according to claim 1, wherein the communication medium is selected from the group comprising: a wired communication medium and a wireless communication medium.

10. The computer-readable storage medium according to claim 1, wherein the one or more characteristics of the second electronic device are selected from the group comprising: a device type identifier; a model identifier; a hardware identifier; a software identifier; and a declarative language document identifier.

11. A method for providing a device experience associated with an electronic device, the method comprising:
identifying device experience information associated with a first electronic device, the device experience information comprising a plurality of declarative language data structures including
a first data structure storing items of first data, a particular item of first data representing a visible object presentable via a graphical user interface, the visible object configured to provide a user experience associated with the first electronic device, and
a second data structure hierarchically associated with the first data structure, the second data structure storing items of second data, a particular item of second data usable to indirectly access a particular resource for providing a particular user experience associated with the first electronic device; and arranging for distribution, via a distribution medium, of the device experience information to a second electronic device, the second electronic device operable to perform a method comprising
identifying when communication is established between the first electronic device and the second electronic device via a communication medium, and after communication is established between the first electronic device and the second electronic device, using the device experience information to display a graphical user interface to a user, the graphical user interface having a first visible object operable to provide, based on a first item of first data, an identification of a source of the first electronic device, and a second, user-selectable visible object operable to provide, based on a second item of first data, control of a function of the first electronic device;
wherein a user experience is selected from the group comprising: presentation of an aspect of the physical appearance of the second electronic device; identification of a status of the second electronic device; identification of a source of the second electronic device; presentation of an advertisement; control of a user-selectable function provided via the second electronic device; and control of a user-selectable function provided via a network-based service.

12. The method according to claim 11, further comprising:
identifying syntax rules defined for the declarative programming language;
ascertaining whether the device experience information conforms to the syntax rules;
when the device experience information conforms to the syntax rules, signing the device experience information via a digital signature; and
arranging for distribution of the signed device experience information to the second electronic device via the distribution medium.

13. The method according to claim 11, wherein the distribution is performed by an entity comprising: an entity that distributes the second electronic device; and a third party entity.

14. The method according to claim 11, wherein the distribution medium is selected from the group comprising: a network-based service; and a computer-readable storage medium.

15. The method according to claim 11, wherein the device experience information is provided by a source of the first electronic device.

16. An electronic device, comprising:
a user interface;
a computer-readable storage medium; and
a processor responsive to the computer-readable storage medium and to a computer program, the computer program when loaded into the processor and executed, operable to perform a method for presenting, via the user interface, a device experience associated with another electronic device, the method comprising:
identifying when communication is established with another electronic device; identifying one or more characteristics of the other electronic device; based on the one or more identified characteristics, identifying a plurality of data structures conforming to syntax rules defined for a declarative programming language, the plurality of data structures including
a first data structure storing items of first data, a particular item of first data representing a visible object presentable via the user interface, the visible object configured to provide a user experience associated with the other electronic device, and
a second data structure hierarchically associated with the first data structure, the second data structure storing items of second data, a particular item of second data usable to indirectly access a particular resource for providing a particular user experience associated with the other electronic device; after communication is established with the other electronic device, identifying a first item of first data representing a first visible object operable to provide an identification of a source of the other electronic device;
identifying a second item of first data representing a second, user-selectable, visible object operable to provide control of a function of the other electronic device; based on the first and second items of first data, presenting the first visible object and the second visible object via the graphical user interface;
wherein a user experience is selected from the group comprising: presentation of an aspect of the physical appearance of the second electronic device; identification of a status of the second electronic device; identification of a source of the second electronic device; presentation of an advertisement; control of a user-selectable function provided via the second electronic device; and control of a user-selectable function provided via a network-based service.

17. The electronic device according to claim 16, wherein the method further comprises:
receiving a user selection of the second visible object via the user interface;
using a particular item of second data to indirectly access a particular resource associated with the second visible object;

based on the resource access, arranging for the other electronic performing the function; and displaying a status of the performance of the function via the user interface.

18. The electronic device according to claim 16, wherein the method step of identifying a plurality of data structures is selected from the group comprising:

searching a local computer-readable storage medium to identify device experience information associated with the other electronic device; and querying a network-based service to identify device experience information associated with the other electronic device.

19. The electronic device according to claim 16, wherein the electronic device and the other electronic device are selected from the group comprising: a personal computer; a telecommunication device; a personal digital assistant; a media player; an in-home entertainment device; a camera; a video recorder; and an in-vehicle device.

* * * * *